United States Patent Office 2,762,787
Patented Sept. 11, 1956

2,762,787

PRESERVATION OF NATURAL AND SYNTHETIC RUBBER AND RUBBER ARTICLES

Isaac Goodman and Arthur Lambert, Manchester, England, John Frederick Smith, Vancouver, British Columbia, Canada, and Gwyn Eifion Williams, Manchester, England, assignors to Imperial Chemical Industries Limited, a corporation of Great Britain No Drawing. Application November 24, 1953,
Serial No. 394,192

Claims priority, application Great Britain
December 3, 1952

5 Claims. (Cl. 260—45.95)

This invention relates to improvements in the preservation of natural and synthetic rubbers and rubber articles.

We have found that $\alpha\beta$-bis-(2-hydroxy-5-methylphenyl)-ethanes in which there is in the 3-position of each of the two phenyl radicals an alkyl, cycloalkyl, or alkylcycloalkyl group having not more than 8 carbon atoms, are excellent preserving agents or antioxidants for natural and synthetic rubbers.

While these antioxidants are likely to find their main applications in the manufacture of vulcanised or cured natural and synthetic rubber articles, they may also be used in the manufacture of non-vulcanised articles and in the preservation of raw or bulk natural and synthetic rubbers, prior to their use in manufacture and especially in storage. They are also suitable for addition to latices of both natural and synthetic rubbers.

When employed in the manufacture of vulcanised articles they may for example be mixed with the rubber along with vulcanising and other ingredients and the resulting mixtures then cured by heat treatment, or they may be mixed with rubber along with other compounding ingredients and the mixture vulcanised by treatment with sulphur monochloride in the cold. The antioxidants are effective in proportions of from about ¼ to 2 per cent of the weight of the rubber.

The synthetic rubbers which may be used include for example polymers of butadiene-1:3 and 2-chloro-butadiene and copolymers of these compounds with acrylonitrile, styrene, methyl methacrylate, isobutylene and other well known polymerisable compounds which are used in the manufacture of these rubbers.

The following examples in which parts are by weight illustrate but do not limit the invention.

Example 1

Vulcanisable rubber stocks of the following compositions were prepared by the usual process of mixing, using as antioxidant 1:2-bis-(2-hydroxy-3:5-dimethylphenyl)-ethane prepared as described by Hultszch (Ber. d. deut. chem. Ges., 1941, 74, 898) and also using no antioxidant.

| Mix | Parts | |
|---|---|---|
| | A | B |
| Pale crepe natural rubber | 100 | 100 |
| Zinc oxide | 10 | 10 |
| Blanc fixe | 75 | 75 |
| Stearic acid | 1 | 1 |
| Sulphur | 3 | 3 |
| Diphenylguanidine | 0.5 | 0.5 |
| Antioxidant | 1 | |

A sheet of each mix was cured at 141° C. for 75 minutes and ageing tests were carried out on the vulcanisates. The results of the ageing tests were as follows:

| | Tensile Strength (Kg./sq. cm.) | |
|---|---|---|
| | A | B |
| Unaged | 179 | 185 |
| Aged in bomb at 70° C. and 300 lbs. per sq. in. oxygen pressure for 12 days | 45 | Perished. |
| Aged in bomb at 70° C. and 300 lbs. per sq. in. oxygen pressure for 16 days | 36 | Perished. |

To show the non-staining properties of the antioxidants, vulcanisable rubber stocks of the following compositions were prepared by the usual process of mixing, using the antioxidant mentioned above, and also no antioxidant.

| Mix | C | D |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| Antioxidant | 1 | |

A sheet of each mix was cured at 125° C. for 12 minutes. Samples of the vulcanised sheets were exposed outdoors with the following results.

| | C | D |
|---|---|---|
| Stain after exposure for 8 weeks outdoors | Pale cream | Pale cream |

Example 2

(a) p-Cresol (540 parts) is mixed with concentrated sulphuric acid (25 parts) and the mixture is stirred and heated at 50° C., while gaseous isobutylene is passed in, the reaction vessel being weighed periodically. After about 20 hours, 284 parts of isobutylene, having been absorbed, 10% sodium carbonate solution (450 parts) is added. The mixture is boiled for 2 hours, cooled, then made strongly alkaline by addition of 20% sodium hydroxide solution (200 parts). The product is extracted with ether and the ether solution is washed with water and dried over sodium sulphate. The ether is evaporated and the residue distilled to give 4-methyl-6-tert.-butylphenol, B. P. 113–120°/20 mm., M. P. 51.5°– 52.5° after recrystallisation from petroleum ether.

Paraform (8.6 parts) and concentrated hydrochloric acid (60 parts) are stirred together and treated with gaseous hydrogen chloride until saturated. The mixture is cooled below 10° C. and 2-tert.-butyl-4-methylphenol (25 parts) in ether (25 parts) is slowly added, keeping the temperature below 10° C. and passing a slow current of hydrogen chloride during the addition.

After allowing the reaction mixture to come to room temperature, ether is added and the ether solution separated, washed with water, and dried over sodium sulphate. The ether is then evaporated at room temperature under reduced pressure and the residue distilled giving 2-hydroxy-3-tert.-butyl-5-methylbenzyl chloride as a pale yellow oil, B. P. 114–116°/0.5 mm.

33 parts of freshly prepared 2-hydroxy-3-tert.-butyl-5-methylbenzyl chloride are stirred in ether (250 parts) for several hours with 10% sodium bicarbonate solution (250 parts). The ether layer is separated, washed with water and dried over sodium sulphate. The drying agent is filtered off and the filtrate evaporated at room temperature under reduced pressure. The residue is warmed with methanol and filtered from the pale yellow solid which precipitates. The filtrate is evaporated at room temperature until a yellow solid begins to separate. After setting aside for some hours the solid is filtered off and recrystallised from petrol to give 2-tert.-butyl-4-methyl-6-methylenecyclohexadien-1-one, M. P. 111–112°. (Found: C, 82.0; H, 9.0. $C_{12}H_{16}O$ requires: C, 81.8; H, 9.1.)

A solution of 2-tert.-butyl-4-methyl-6-methylenecyclohexandiene-1-one (4 parts) in ether (50 parts) is stirred with granulated zinc (10 parts) while concentrated hydrochloric acid (30 parts) is added over two hours. The ether solution is separated from the aqueous layer, washed acid-free with sodium bicarbonate solution and dried over magnesium sulphate. Evaporation of the solution after filtering off the magnesium sulphate leaves a residue of 1:2-bis-(2-hydroxy-3-tert.-butyl-5-methylphenyl)ethane, M. P. 105–106°. This melting point is not raised by recrystallisation from petroleum ether. (Found: C, 81.4; H, 9.7. $C_{24}H_{34}O_2$ requires: C, 81.3: H, 9.7%.)

This compound can also be prepared by the reaction of 1:2-bis-(2-hydroxy-5-methylphenyl)ethane with isobutylene in the presence of p-toluenesulphonic acid.

(b) The corresponding 1:2-bis-(2-hydroxy-3-tert.-amyl-5-methylphenyl)ethane can be prepared in similar ways to the two given above.

*Example 3* p-Cresol (150 parts) is heated with concentrated sulphuric acid (S. G. 1.84; 13.4 parts) at 90–100° C. for ½ hour and then cooled to 40° C. α-Methylcyclohexene (97 parts) is added over ¾ hour with stirring at 50°–60° C. After stirring at 60° C. for 1 hour, a solution of anhydrous sodium carbonate (30 parts) in water (300 parts) is added and the whole boiled under reflux for 1 hour. The oil layer is separated and washed with a solution of sodium hydroxide (50 parts) in water (500 parts). This washing is repeated twice. The washed oil layer is then dissolved in a solution of potassium hydroxide (262 parts) in water (300 parts) and methanol (320 parts). The solution is washed with 3 portions of 100 parts each of light petroleum (B. P. 60–80° C.). The washed solution is diluted with water (750 parts), acidified by the addition of concentrated hydrochloric acid (500 parts) and extracted with two portions of 155 parts each of ether. Distillation of the combined ethereal extracts gives 2-(α-methylcyclohexyl)-4-methylphenol, B. P. 150–160° C./10 mm.

Paraform (10.5 parts) and concentrated hydrochloric acid (85 parts) are stirred together at 0–10° C. and treated with gaseous hydrogen chloride until saturated. 2-(α-methylcyclohexyl)-4-methylphenol (30 parts) in ether (21 parts) is added over ½ hour, keeping the temperature below 10° C. and passing a slow current of hydrogen chloride during the addition.

After allowing the reaction mixture to come to room temperature, ether (200 parts) is added and the ether solution separated, washed with water and dried over sodium sulphate. The ether is then evaporated under reduced pressure, the residue is dissolved in light petroleum (B. P. 40–60° C.) and the solution cooled to −20° C. The solid which separates is recrystallised from light petroleum giving 2-hydroxy-3-(α-methylcyclohexyl)-5-methylbenzyl chloride, M. P. 41–420 C. (Found: C, 71.6; H, 8.3; Cl, 14.0 $C_{15}H_{21}OCl$ requires: C, 71.3; H, 8.4; Cl, 14.0%.)

A solution of 2-hydroxy-3-(α-methylcyclohexyl)-5-methylbenzyl chloride (5.5 parts) in ether (50 parts is run slowly into 10% sodium bicarbonate solution (55 parts) with rapid stirring during two hours. The ether layer is separated, washed with water and dried over sodium sulphate. The ether is evaporated under reduced pressure and the deep yellow residue is dissolved in benzene (88 parts). The benzene solution is stirred with zinc dust (20 parts) with the addition of concentrated hydrochloric acid (71 parts) during two hours. Unreacted zinc is filtered off and the benzene layer is separated, washed successively with water, and with 5% sodium bicarbonate and then dried over sodium sulphate. The benzene solution is distilled giving 1:2-bis-(2-hydroxy-3-(α-methylcyclohexyl)-5-methylphenyl)ethane, B. P. 220–224° C./0.2 mm. (Found: C, 82.9; H, 9.3. $C_{30}H_{42}O_2$ requires: C, 82.9; H, 9.7%.)

*Example 4*

Butyryl chloride (170 parts) is added slowly to p-cresol (153 parts) with stirring. After standing for 2 days, 5% sodium hydroxide solution (90 parts) is added with stirring. The product is taken up in benzene (1000 parts) and the solution is washed with water, dried over sodium sulphate and is distilled giving p-cresyl butyrate, B. P. 132–3° C./14 mm.

Powdered aluminium chloride (147 parts) is added slowly to p-cresyl butyrate (178 parts) with stirring. After the evolution of hydrogen chloride has diminished, the viscous mixture is stirred at 160–180° C. in an oil bath for one hour. When cool, the complex is decomposed with ice-water and the product is taken up in benzene (1000 parts). The benzene solution is separated, washed with water, dried over sodium sulphate and is distilled. The material boiling 140–152° C./17 mm. is fractionated giving 2-hydroxy-5-methylbutyrophenone, B. P. 136°/8 mm. (Found: C, 74.4; H, 8.1. $C_{11}H_{14}O_2$ requires: C, 74.1; H, 7.9%.)

2-hydroxy-5-methylbutyrophenone (100 parts) is heated under reflux with amalgamated zinc (300 parts), ethanol (158 parts), water (300 parts) and concentrated hydrochloric acid (350 parts) for 19 hours with stirring. When cold, the oil is taken up in benzene (500 parts) washed with water, dried over sodium sulphate and fractionated to give 2-n-butyl-4-methylphenol, B. P. 124–6° C./8 mm.

2-n-butyl-4-methylphenol is chloromethylated using the method described in Example 2, to give 2-hydroxy-3-n-butyl-5-methylbenzyl chloride, B. P. 122° C./1.1 mm.

A solution of 2-hydroxy-3-n-butyl-5-methylbenzyl chloride (11 parts) in ether (71 parts) is added during one hour to 18% sodium hydroxide solution (24 parts). After stirring for one hour the ether layer is separated, washed with water and dried over sodium sulphate. The ether is evaporated under reduced pressure and the pale yellow residue is crystallised from acetone-methanol. The material obtained is recrystallised from the same solvent to give polymeric 2-n-butyl-4-methyl-6-methylenecyclohexadien-1-one, M. P. 79–81° C. (Found: C, 81.6; H, 9.0. $C_{12}H_{16}O$ requires: C, 81.8; H, 9.1%.)

Polymeric 2 - n - butyl - 4 - methyl - 6 - methylene - cyclohexadien - 1 - one (10.5 parts) is heated at 220–240° C. for 3 hours. Distillation then gives 1:2 - bis - (2 - hydroxy - 3 - n - butyl - 5 - methylphenyl)ethane, B. P. 205–209° C./0.4 mm. (Found: C, 81.4; H, 9.6. $C_{24}H_{34}O_2$ requires: C, 81.3; H, 9.7%.)

*Example 5*

(a) Concentrated sulphuric acid (368 parts) is added to water (70 parts) and the diluted acid is cooled to 10° C. Sec-butanol (72 parts) and p-cresol (150 parts) are added and the mixture is warmed to 40° C. The solution is then set aside for 1 hour during which time the product separates as an upper layer. The product is separated and boiled with excess 20% anhydrous sodium carbonate solution. The product is then taken up in benzene and the benzene layer separated, washed with water and dried over sodium sulphate. Distillation of the benzene solution gives 2-sec-butyl-4-methylphenol, B. P. 124–134° C./14 mm.

2-sec-butyl-4-methylphenol is chloromethylated using the method described in Example 2 to give 2-hydroxy-3-sec-butyl-5-methylbenzyl chloride, B. P. 118–119° C./1.0 mm.

A solution of 2-hydroxy-3-sec-butyl-5-methylbenzyl chloride (50 parts) in ether (210 parts) is run into 13% sodium hydroxide solution (167 parts) with stirring during one hour. The ether layer is separated and washed with water. Zinc dust (25 parts) is then added to the ether solution and concentrated hydrochloric acid (88 parts) is run in with stirring during one hour. The ether layer is washed successively with water and 5% sodium bicarbonate solution and then dried over sodium sulphate. The ether is evaporated under reduced pressure and the residue is distilled. The material boiling 180–240° C./1.2 mm. is redistilled to give 1:2-bis-(2-hydroxy-3-sec-butyl-5-methylphenyl)ethane, B. P. 220–235° C./1.7 mm. (Found: C, 81.6; H, 9.5. $C_{24}H_{34}O_2$ required: C, 81.3; H, 9.7%.)

(b) 1:2 - bis - (2 - hydroxy - 3 - cyclohexyl - 5 - methylphenyl)ethane can also be made similarly, according to the directions given in Example 5(a), starting from cyclohexanol.

Example 6

The antioxidants of Examples 2(a), 3, 4 and 5(a) were incorporated in the usual manner with mixes having the compositions given below:

| Mix | Parts | | | | |
|---|---|---|---|---|---|
| | E | F | G | H | J |
| Pale crepe natural rubber | 100 | 100 | 100 | 100 | 100 |
| Zinc oxide | 10 | 10 | 10 | 10 | 10 |
| Blanc fixe | 75 | 75 | 75 | 75 | 75 |
| Stearic acid | 1 | 1 | 1 | 1 | 1 |
| Sulphur | 3 | 3 | 3 | 3 | 3 |
| Diphenylguanidine | 0.5 | 0.5 | 0.5 | 0.5 | 0.5 |
| Antioxidant Example 2 (a) | 1 | | | | |
| Antioxidant Example 3 | | 1 | | | |
| Antioxidant Example 4 | | | 1 | | |
| Antioxidant Example 5 (a) | | | | 1 | |
| No antioxidant | | | | | |

A sheet of each mix was cured for 75 minutes at 141° C. and ageing tests carried out on the resulting vulcanisates. The results of the ageing tests were as follows:

| | Tensile strength (Kg./cm.²) | | | | |
|---|---|---|---|---|---|
| | E | F | G | H | J |
| Unaged | 151 | 165 | 175 | 157 | 178. |
| Aged in bomb at 75° C. and 300 lb./sq. in. oxygen pressure for 12 days | 96 | 84 | 43 | 20 | Perished. |
| Aged in bomb at 75° C. and 300 lb./sq. in. oxygen pressure for 16 days | 59 | 65 | 31 | Perished | Perished. |

Example 7

To show the non-staining properties of the antioxidants vulcanised rubber stocks of the following compositions were prepared by the usual process of mixing, using the antioxidants, Examples 2(a), 3, 4, 5(a) and also no antioxidants.

| Mix | K | L | M | N | O | P |
|---|---|---|---|---|---|---|
| Pale crepe natural rubber | 100 | 100 | 100 | 100 | 100 | 100 |
| Zinc oxide | 10 | 10 | 10 | 10 | 10 | 10 |
| Blanc fixe | 75 | 75 | 75 | 75 | 75 | 75 |
| Stearic acid | 1 | 1 | 1 | 1 | 1 | 1 |
| Titanium dioxide | 10 | 10 | 10 | 10 | 10 | 10 |
| Sulphur | 2.5 | 2.5 | 2.5 | 2.5 | 2.5 | 2.5 |
| Zinc diethyl-dithiocarbamate | | | | | 0.375 | 0.375 |
| Tetramethyl thiuram monosulphide | 0.5 | 0.5 | 0.5 | 0.5 | | |
| Antioxidants of: | | | | | | |
| Example 2(a) | 1 | | | | | |
| Example 3 | | 1 | | | | |
| Example 4 | | | 1 | | | |
| Example 5(a) | | | | 1 | | |

Cure: mixes K–N, 10 minutes at 141° C., mixes O, P, 12 minutes at 125° C.

| Stain after exposure for 8 weeks outdoors. | Pale cream. | Pale cream. | Pale cream. | Pale cream. | Pale cream. | Pale cream. |
|---|---|---|---|---|---|---|

What we claim is:

1. A composition comprising a member of the group consisting of natural rubber and synthetic rubber polymers obtained by polymerizing a diolefinic compound, and latices thereof, having incorporated therein, as an antioxidant, an alpha, beta-bis-(2-hydroxy-5-methylphenyl)-ethane in which there is in the 3-position of each of the two phenyl radicals a substituent with not more than 8 carbon atoms selected from the group consisting of alkyl, cycloalkyl, and alkylcycloalkyl.

2. The composition of claim 1 wherein the amount of antioxidant is from 0.25 to 2 per cent on the weight of said member.

3. The composition of claim 1 wherein the antioxidant is 1:2 - bis - (2 - hydroxy - 3 - tert. - butyl - 5 - methyl - phenyl) ethane.

4. The composition of claim 1 wherein the antioxidant is 1:2 - bis - (2 - hydroxy - 3 - tert. - amyl - 5 - methyl - phenyl) ethane.

5. The composition of claim 1 wherein the antioxidant is 1:2 - bis - (2 - hydroxy - 3 - alpha - methylcyclohexyl - 5 - methylphenyl)ethane.

References Cited in the file of this patent
UNITED STATES PATENTS 2,538,355  Davis et al. _____ Jan. 16, 1951